(12) United States Patent  
Barefoot

(10) Patent No.: US 8,727,080 B2
(45) Date of Patent: May 20, 2014

(54) MAGNETIC VALVE FOR SHOCK ABSORBERS

(75) Inventor: Darek C. Barefoot, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 20 days.

(21) Appl. No.: 13/345,197

(22) Filed: Jan. 6, 2012

(65) Prior Publication Data

US 2012/0160622 A1     Jun. 28, 2012

Related U.S. Application Data

(62) Division of application No. 11/501,996, filed on Aug. 10, 2006, now Pat. No. 8,104,591.

(60) Provisional application No. 60/707,385, filed on Aug. 11, 2005.

(51) Int. Cl.
     *F16F 9/53*          (2006.01)

(52) U.S. Cl.
     USPC ............... 188/267.2; 188/282.7; 188/322.13; 188/322.15; 188/299.1; 188/319.1

(58) Field of Classification Search
     USPC ............... 188/267.2, 282.7, 322.13, 322.15, 188/299.1, 319.1; 280/276
     See application file for complete search history.

(56) References Cited

U.S. PATENT DOCUMENTS

| | | | |
|---|---|---|---|
| 2,667,895 A * | 2/1954 | Pool et al. .................. | 137/528 |
| 3,026,903 A | 3/1962 | Roach | |
| 3,495,620 A | 2/1970 | Raimondi et al. | |
| 4,690,371 A | 9/1987 | Bosley et al. | |
| 4,874,012 A * | 10/1989 | Velie ....................... | 137/557 |
| 4,946,009 A | 8/1990 | Knutson | |
| 4,973,854 A | 11/1990 | Hummel | |
| 5,025,899 A | 6/1991 | Lizell | |
| 5,244,063 A | 9/1993 | Laurien et al. | |
| 5,263,559 A * | 11/1993 | Mettner .................... | 188/266.5 |
| 5,320,136 A | 6/1994 | Morris et al. | |
| 5,372,223 A * | 12/1994 | DeKock .................... | 188/285 |
| 5,542,509 A | 8/1996 | Bell | |
| 5,632,361 A * | 5/1997 | Wulff et al. ................ | 188/267 |
| 6,105,987 A * | 8/2000 | Turner ...................... | 280/276 |
| 6,131,709 A | 10/2000 | Jolly et al. | |
| 6,343,677 B2 | 2/2002 | Bell | |
| 6,619,445 B2 * | 9/2003 | Forster ..................... | 188/315 |
| 6,851,528 B2 * | 2/2005 | Lemieux ................... | 188/322.14 |
| 2004/0222056 A1 | 11/2004 | Fox | |
| 2005/0104320 A1 | 5/2005 | Wesling | |

* cited by examiner

*Primary Examiner* — Robert A Siconolfi
*Assistant Examiner* — Mahbubur Rashid
(74) *Attorney, Agent, or Firm* — Jason H. Foster; Kremblas & Foster

(57) ABSTRACT

A shock absorber having a valve controlling the flow rate of fluid between a compression chamber and a rebound chamber in a housing and separated by a piston. The valve has an orifice component and a blocker component, one of which has a permanent magnet, and the other of which has a magnetically permeable material. Upon the application of sufficient fluid pressure, the blocker component is forced away from the orifice component, despite the magnetic bias that tends to attract the two structures. Because the magnetic force decreases as the two components are spaced farther apart, the shock absorber has excellent performance characteristics. Alternatively, a mechanical spring urges the blocker closed, and magnetic attraction between the blocker and a spaced opener mitigates the increased force of the compressed spring tending to close the valve.

27 Claims, 11 Drawing Sheets

MAGNETIC VALVE FOR SHOCK ABSORBERS

CROSS-REFERENCES TO RELATED APPLICATIONS

This is a divisional application of U.S. application Ser. No. 11/501,996 filed Aug. 10, 2006, which claimed the benefit of U.S. Provisional Application No. 60/707,385 filed Aug. 11, 2005. Both applications are incorporated herein by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

The invention relates generally to suspension components on vehicles, and more particularly to a shock absorber with a damper valve that incorporates magnetic bias to improve valve performance. Such a device may be referred to as a threshold valve.

2. Description of the Related Art

Conventional shock absorbers employ a piston in a cylinder containing a substantially incompressible fluid. Orifices in the piston and passages leading to a fluid reservoir regulate the flow of oil so as to damp the oscillation of a suspension spring. In more advanced designs, the orifices include sprung valves, which commonly take the form of holes covered by flexible shims made of elastically deformable material, such as spring steel. Valves of this design open progressively with greater force and can be used to damp low-speed compression and/or extension of shock absorbers while preventing pressure "spikes" and consequent harshness of ride when the suspension must compress deeply and quickly. They can also permit the shock to extend rapidly after deep compression while slowing it sufficiently near maximum extension to prevent harsh "topping out". Though superior to simple orifice dampers, dampers with flow-sensitive shims have limited potential for distinguishing between bumps and movements of the vehicle chassis.

In recent years some shock absorbers have been equipped with damper valves that are electromechanically actuated and are controlled by an electronic feedback system, sometimes in combination with a compressor for selectively varying fluid pressure in the damper. The nature of a given suspension event in such an apparatus is determined by computational projection, and then adjustments to damping resistance are made according to programmed instructions.

An approach that is less complex than electronic control yet more sophisticated than traditional shimmed orifices employs valves that are biased toward the closed position by the pressure of a confined gas or a preloaded mechanical spring. These devices provide relatively stiff damping resistance up to a certain threshold of applied force. Once the threshold is reached and the valve begins to open, relatively little additional force is required to move the valve to its fully open position, since a gas spring or preloaded mechanical spring can be designed to offer resistance along a gently sloped plot of load vs. deflection. This kind of valve makes possible relatively heavy damping of forces that are gradually applied to the suspension of a vehicle, such as rearward chassis movement during acceleration ("squat"), forward movement during braking ("dive"), and side-to-side tilt toward the outside of a curve ("roll") while providing somewhat lighter damping of rapid, forceful movements of the vehicle wheel as it encounters bumps and depressions in the road surface.

Yet another approach is to employ what is commonly known as an inertia valve in a compression and/or rebound circuit of the shock damper. This type of valve consists of a weighted element (or elements) supported by or suspended from a mechanical spring (or springs). The element covers an oil port, acting as a blocker, and is of such a weight relative to the spring constant of the supporting spring that the element is dislodged, and the port consequently opened, only by upward or downward acceleration of the vehicle wheel.

The variable damping response afforded by preloaded shock valves and inertia valves as described above is particularly desirable for off-road bicycle suspension systems. In order to climb hills, the bicycle rider typically must stand on the pedals and pull vigorously on the handlebars, causing the rider's body weight to shift side-to-side and fore-aft. Conventional suspension damping allows unwanted "bobbing" of the bicycle and loss of pedaling efficiency when the rider's weight shifts in this way. The off-road bicycle application therefore places a premium on dampers that offer increased resistance to rider-induced suspension movement while minimally compromising sensitivity to road-induced suspension movement, such as bumps.

Although a preloaded, sprung damper valve may open along a gently sloping load vs. deflection plot once its force threshold is reached, its sensitivity nevertheless is limited by the continued upward direction of the gradient. In the case of rapid compression, when a bump is encountered the initial vertical acceleration or "shock force" causes a sudden rise in pressure that begins to open the preloaded valve. But this acceleration, with its attendant peak pressure, fades long before the wheel finishes surmounting the bump, thereby allowing the valve to close prematurely under the countervailing force of the spring. With the valve closed, damping resistance increases and a substantial part of the bump force is transmitted to the vehicle chassis. As this transmission of bump force increases, the ride becomes harsher and the vehicle's traction over irregular surfaces becomes poorer.

Similarly, in the case of rapid extension of a shock in which the rebound damping circuit is governed by a preloaded, sprung valve, the spring that urges the valve to close may overcome the force exerted by oil flow through the rebound circuit before the shock absorber fully extends, thereby reducing the available stroke of the suspension and adversely affecting ride quality.

The rebound performance objective during extension is rapid recovery from deep compression followed by smooth deceleration as extension is reached. Valves biased toward the closed position by mechanical springs necessarily limit the extent to which dampers can achieve this objective, because the spring force applied increases as the valve is opened further, thereby requiring an increasing force to maintain the valve in an open position at a time when the valve-opening force inherently decreases.

Inertia valves are subject to an analogous problem due to the progressively increasing resistance of a coil or leaf spring as it deflects. The sprung element that acts as a valve blocker, after having been dislodged by acceleration of the vehicle wheel as it moves over a bump, tends to return to the closed position before the bump has been fully negotiated. The result, again, is transmission of bump force to the chassis.

Even in designs where the movement of the sprung blocker element is itself hydraulically damped, the spring return force is sufficient to impart inertia to the element. The inertia imparted by the spring to the blocker element may vary undesirably the response of the valve to accelerations of the vehicle wheel as it traverses bumps of different sizes at different frequencies.

In view of the above, the need exists for a damper valve that is biased toward the closed position at least partly by a force that does not increase as the valve opens.

BRIEF SUMMARY OF THE INVENTION

The ability of a suspension damper to control unwanted chassis movements and yet compliantly absorb bumps is enhanced by the present invention insofar as damper valve closure in the invention is maintained by a force that moderates as the valve opens. The higher the force holding the valve in the closed position, the less unwanted chassis movement will occur. However, the lower the force urging closure of the valve once the valve opens, the longer the period of hydraulic fluid flow during the traversal of a bump and the less jounce will be transmitted to the vehicle (i.e., the better the vehicle will absorb the shock). A retrogressive component of biasing force on the valve also enhances suspension performance during rebound. Valves requiring a lower force to remain in the open position relative to the biasing force acting upon them in the closed position approach the performance ideal of rapid recovery from deep compression followed by smooth deceleration as extension is reached.

A preferred embodiment of the present invention is a damper with a compression and/or rebound valve biased toward the closed position either partly or entirely by continuous magnetic force. The magnetically sprung valve may be combined with an external mechanical adjustment means. The adjustment means permits the magnetic force to be varied, or permits a non-magnetic biasing force acting in combination with magnetism to be altered so as to change the relative amount of overall valve closing force due to magnetism. Since the maximum rate of fluid flow through the compression or rebound circuit of the damper determines the peak pressure that can be exerted on the magnetically sprung valve, auxiliary valves that vary maximum rate of flow can also dynamically interact with the magnetically sprung valve to give the damper its performance features.

The elements of the valve are arranged such that the slope of the load/deflection gradient governing the action of the valve is reduced by the magnetic component of force acting on the valve. Thus, an externally adjustable force threshold is created above which the valve opens to a greater degree than it would were closure maintained exclusively by mechanical spring pressure. Valves having this characteristic are useful in the design of shock absorbers that feature a different damping rate for low-speed suspension events (i.e., inertial movement of sprung vehicle mass) as opposed to the rapid compression and extension that occurs when the vehicle wheel encounters bumps (movement of unsprung mass).

In an alternative embodiment of the invention, a mechanical spring can be used to close the valve with a magnetic spring that urges the valve to the open position once pressure due to compression has opened the valve. A coil spring biases the valve closed, and is combined with a structure in which magnetic attraction tends to keep the valve open once the valve has opened by overcoming the coil spring bias. The attraction between a valve component and an opener becomes substantial once the valve opens, and as the valve component moves farther from the closed position, the magnetic attraction increases. This thereby counteracts the increase in force tending to close the opened valve by increasing the magnetic attraction that tends to open the valve as the compression of the coil spring increases.

Figure 1:
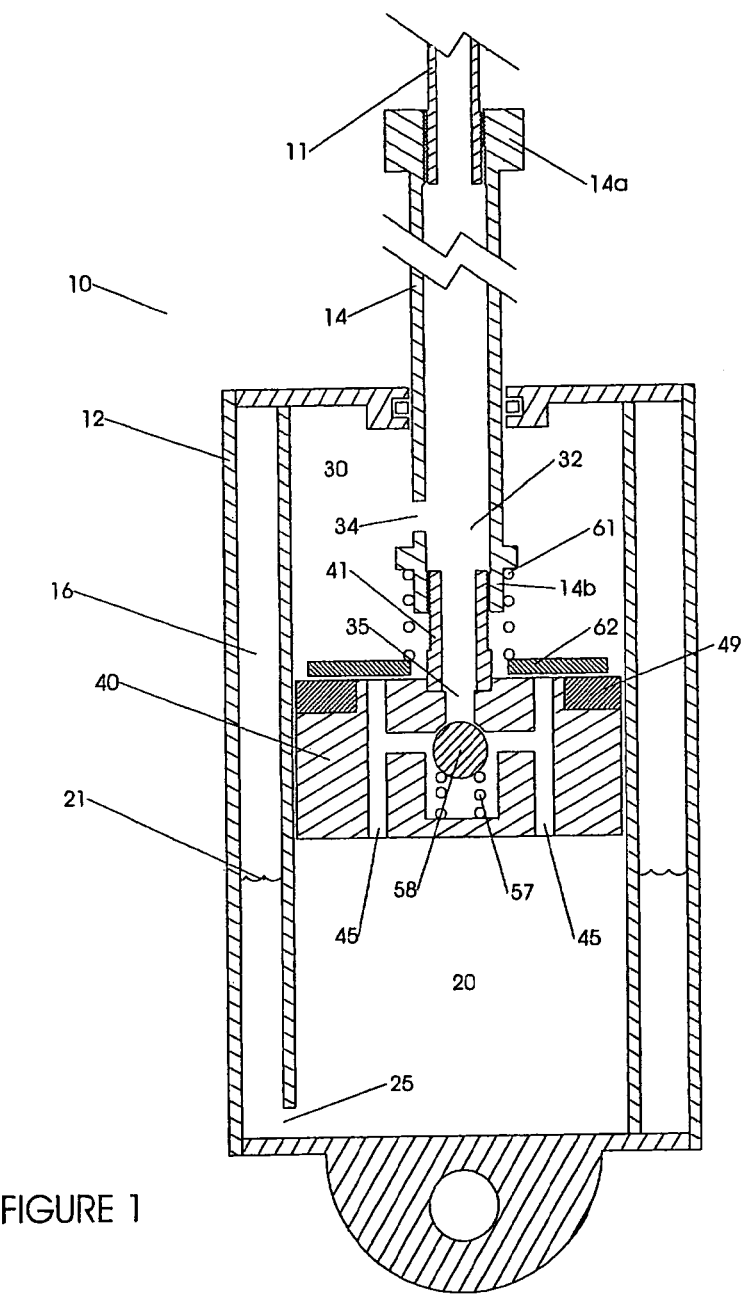
FIG. 1 is a section view illustrating an embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

FIG. 1 shows the basic components of the shock absorber damper 10 including the cylindrical housing 12, the piston rod 11 and piston 40. The double wall of the housing forms the compartment 16 that contains a gas or other compressible medium that permits the level of fluid in the reservoir 21 to vary with displacement of fluid from chamber 20 through the port 25 as the piston rod enters the housing. This is described more fully below.

The velocity at which the piston 40 can move further into the housing under a given load is partly governed by the rate at which oil or other hydraulic fluid can flow from the compression chamber 20 through the port 45 in the piston 40, thence past the compression shim 62 and into the rebound chamber 30. It will become apparent that the compression shim 62 serves as part of a valve that is biased into the closed position by magnetic attraction between the shim 62 and the ring 49 embedded in the piston. These cooperating components tend to force the shim 62 in sealing contact with the piston 40, thereby blocking or severely restricting oil flow below a threshold of hydraulic pressure.

Either the shim 62 component of the valve is a magnet, preferably a permanent magnet, or the ring 49 component of the valve is a magnet. The other of the components is a magnetically permeable material. The term "magnetically permeable" is defined herein to mean any material that is magnetically attracted to a magnet, including but not limited to a magnet, iron or an iron alloy. The magnets described herein can consist of discrete segments of the components in which they are shown in the illustrations, or the entire structure in which the components are shown mounted. For example, where the ring 49 is shown mounted in the piston 40 in FIG. 1, the entire piston can, in an equivalent structure, be made of a magnetic material. Likewise, the entire shim 62 is shown as a magnet, but it is possible to make only a portion of the shim a magnet. In one contemplated embodiment the ring 49 is a magnet and the shim 62 is a steel washer. Whether the shim, or the ring, or both are magnetized can affect the level of force desired, which will be determined based upon other practical considerations.

The ports 45 are formed in the piston 40 to form orifice components of the valve. The orifice components are the openings in a structure through which fluid can flow and the immediately surrounding structure in which a magnetically permeable structure can be mounted. Thus, the orifice components of FIG. 1 include at least parts of the piston 40 and the ring 49. Furthermore, the shim 62 is a moveable orifice blocker component of the valve, which prevents or reduces fluid flow through the orifice when the blocker is in its closed position in the orifice or against the surrounding structure. The orifice blocker is urged toward a closed position (in a direction opposite the direction of fluid flowing through the orifice) by a magnetic bias formed by the permanent magnet and the magnetically permeable body. Upon the application of sufficient force by fluid in one chamber, the magnetic bias will be exceeded, thereby forcing the blocker from the closed position to the open position. Thus, the valve components include the orifice components and blocker components.

The sealing action of the shim 62 is further maintained in the preferred embodiment by the mechanical (coil) shim spring 61. It is contemplated that, in an alternative embodiment (not shown), there can be no mechanical spring 61. Instead, in this alternative, the magnetic spring can exert the entire valve-closing force. Other mechanical springs, including gas and elastomeric springs, can be substituted for the shim spring 61 in other alternatives, as will be apparent.

The velocity at which the piston rod 11 can re-extend after compression is governed by the rate at which oil can flow from the rebound chamber 30 into the hollow cavity 32 of the piston rod 11, through the orifice 35 of the piston 40, past the valve ball 58 (as the closing pressure of the valve spring 57 is overcome), and through the ports 45 into the compression chamber 20. As the piston 40 moves upward (in FIG. 1) during extension, previously displaced fluid in the reservoir 21 is drawn back into the compression chamber 20 through the port 25.

It will be appreciated that because closure of the compression circuit of the damper is affected at least partly by magnetic attraction between the valve components, the force required to hold the valve components in the open position will vary at least partly according to the principle of the diminution of magnetic force that occurs with increasing distance between magnetically attracted masses. This relationship embodied in the cooperating structures provides the advantage that the magnetic force tending to hold the damper valve closed is quite high when the valve is closed and decreases once the valve has been opened. Furthermore, the closing force of the magnetic attraction diminishes substantially as the shim 62 and ring 49 are spaced further apart. Of course, one need not have the magnetically attractive components in contact when the valve is closed. Thus, one may provide a structure in which magnetically attracted valve components never touch, but are configured to be close to one another when the valve is closed to have a similar effect (see FIG. 2 below and accompanying description).

In the configuration shown in FIG. 1, the force that urges the shim 62 toward the piston 40 is made up of a ratio of the magnetic attraction of the magnetically attracted components and the mechanical force of the spring 61. Thus, adjusting the preload on the spring 61 alters the damping characteristics of the device. An embodiment of a structure that adjusts the force tending to force the shim 62 against the piston 40 without affecting the proximity of the valve components will now be described. A linkage extends from the exterior of the shock absorber to the valve to adjust the bias tending to close the valve. In an exemplary linkage, a spring tension adjuster 14 is threadably engaged at its upper extremity 14a with the piston rod 11 and at its lower extremity 14b with the piston stud 41. Rotating the spring tension adjuster 14, preferably by a rotatable knob or other human hand-adjustable structure, relatively increases or decreases the preload (existing compression) of the coil shim spring 61 against the shim 62, thereby changing the ratio of the forces that urge the shim 62 toward the piston 40. Any suitable means by which the compression of the shim spring 61 is varied can be used to preload or unload the spring 61, as will be apparent to one of ordinary skill from the description herein.

Figure 2:
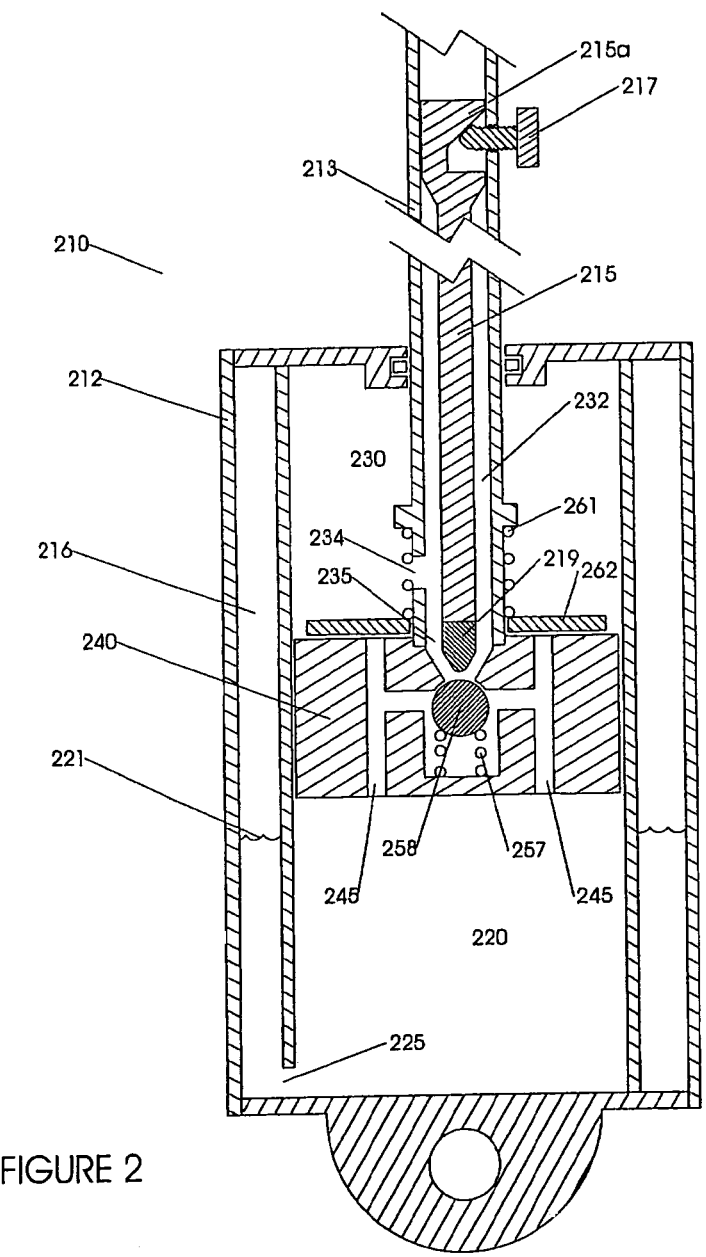
FIG. 2 is a section view illustrating an alternative embodiment of the present invention.

Referring to FIG. 2, many of the same basic structural elements are present as in the device of FIG. 1. Additionally, a device for adjusting the proximity of valve components is shown. Oil flows between chambers 220 and 230 through ports and orifices in the same directions as described in relation to FIG. 1. However, the flow of oil from the compression chamber 220 to the rebound chamber 230 is opposed solely by the pressure of the shim spring 261 against the shim 262. Furthermore, upon rebound the reverse flow from the rebound chamber through port 234 and orifice 235 is opposed not only by the force of the valve coil spring 257 against the valve ball 258 but by a magnetic attraction between the valve ball and the end piece 219 of the adjuster needle 215. One of the valve ball 258 or end piece 219 is a permanent magnet, while the other is a magnetically permeable material. Of course, both may be permanent magnets oriented attractively with respect to each other.

The adjuster needle 215 is contained within the hollow piston rod 213. The upper extremity of the needle forms the cam 215a abutted angularly against the shaft of the threaded adjustment knob 217. When the knob 217 is tightened, the needle 215 is forced axially upwardly within the piston rod 213. When the knob 217 is loosened, hydraulic suction during rebound in combination with the magnetic attraction between the end piece 219 and valve ball 258 moves the needle 215 axially downwardly to the extent permitted by the abutment of the cam against the shaft of the knob. The axial displacement of the needle 215 in turn varies the gap between the end piece 219 and the valve ball 258 and thereby varies the strength of the magnetic component of force acting to maintain closure of the valve. When the valve components are closer, the strength increases. Rapid rebound of the damper occurs when the adjustable force threshold created by the magnetic attraction between the end piece 219 and valve ball 258 is overcome. Any suitable means by which the relative positions of the valve ball 258 and the end piece 219 are varied can be used to vary the amount of magnetic attraction between the valve components, as will be apparent to one of ordinary skill from the description herein.

Because the magnetic component of force diminishes as the valve opens and the valve components are thereby spaced further apart, during rebound oil will continue flowing relatively longer than it would were closure maintained by a comparable level of force generated solely by preload on the coil valve spring 257. The damper thus can be adjusted, using the adjustment means described herein, to rebound slowly during recovery from suspension events of low amplitude but rebound rapidly following deep compression. The rapid rebound allows for rapid recovery of the suspension, yet the closure of the valve and re-establishment of the activation threshold near the end of the rebound stroke prevents reactive jounce and harsh "topping out".

The ports 235 are formed in the piston 240 to form an orifice component of the valve. The orifice component is in a structure through which fluid can flow and the immediately surrounding structure in which a magnetically attractive structure (end piece 219) is mounted. The valve ball 258 is a moveable orifice blocker component of the valve, which prevents or reduces fluid flow through the orifice when the blocker is in its closed position. The orifice blocker is thus urged toward a closed position (in a direction opposite the direction of fluid flowing through the orifice) by a magnetic bias formed by the permanent magnet and the magnetically permeable body. Upon the application of sufficient force by fluid in one chamber, the magnetic bias will be exceeded, thereby forcing the blocker from the closed position to the open position.

Figure 8:
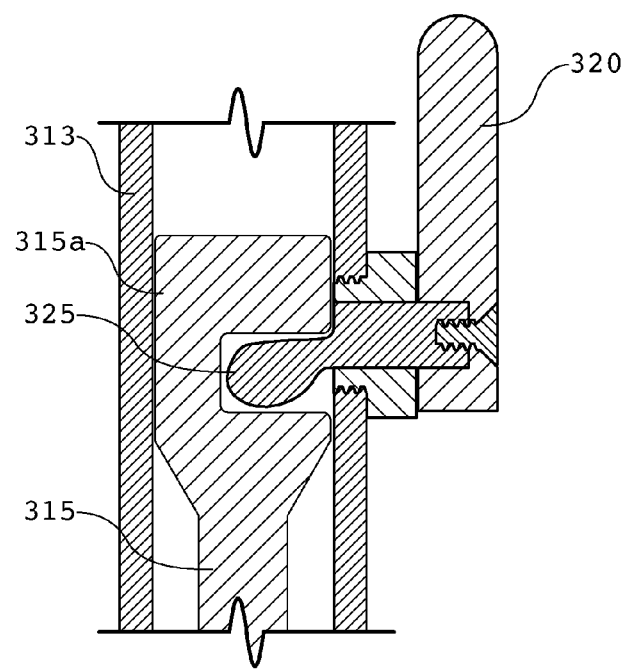
FIG. 8 is a side view in section illustrating an alternative means for adjusting the magnetic and/or mechanical spring bias.

FIG. 8 shows an alternative method of adjusting the distance between magnetic valve elements in a device like that shown in FIG. 2, or the pre-loaded compression on the mechanical spring shown in FIG. 1. The adjuster needle 315 is within the shock absorber shaft 313, and the top segment 315a is formed to accept the lobe 325 of a cam lever 320. The cam lever 320 is rotatably mounted in the shaft 313. When the cam lever 320 is rotated, the offset tip thereof displaces the adjuster needle 315 axially up or down (in the orientation illustrated in FIG. 8) within the shaft 313, causing the magnetic tip of the needle (not shown but similar to that in FIG. 2) to be brought closer to or farther from the other magnetic elements of the valve. Thus, the degree of magnetic bias acting on the valve is altered. Of course, the same mechanism can be used to adjust the amount of pre-load compression on the spring 61.

Figure 9:
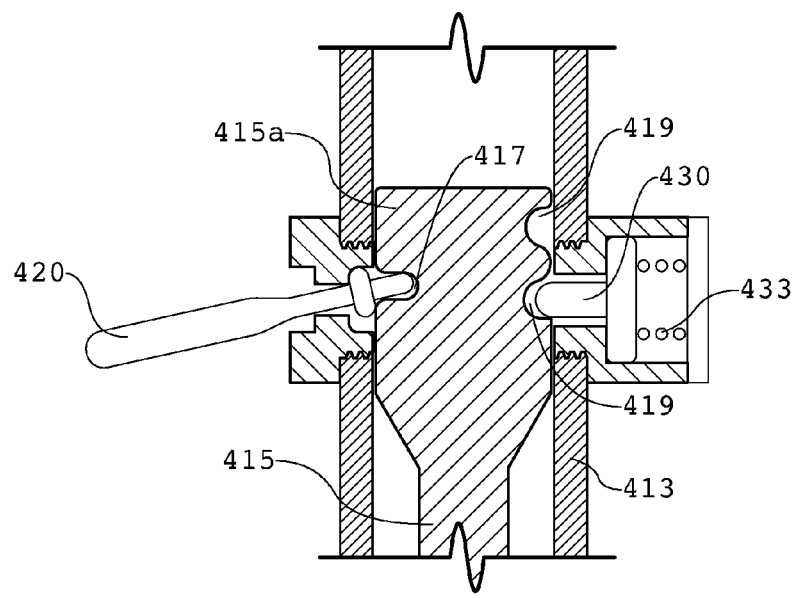
FIG. 9 is a side view in section illustrating an alternative means for adjusting the magnetic and/or mechanical spring bias.

FIG. 9 shows still another means of adjusting the springs that is similar in function to that of FIGS. 2 and 8. The adjuster needle 415 is within the shaft 413, and the top segment 415a is formed with the cavity 417 on one side. The end of the lever switch 420 is engaged with the cavity 417, and pivoting movement of the lever switch 420 up or down (in the orientation illustrated in FIG. 9) displaces the adjuster needle 415 axially within the shaft. The position of the adjuster needle 415 is maintained by a series of cavities 419 opposite the cavity 417. The plunger 430, under the action of the spring 433, remains engaged with a particular one of the cavities 419 and thereby maintains the axial position of the adjuster needle until a force is exerted on the lever switch 420 that causes the adjuster needle 415 to move, thereby dislodging the plunger 430 from one cavity and allowing it to engage another.

By these means the distance, and therefore the attractive force, between the magnetic valve components on the lower end (not shown—similar to that shown in FIG. 2) of the adjuster needle 415 and other magnetic valve components is altered. Of course, the structure of FIG. 9 could also be used to vary the pre-load compression on the mechanical spring 61 shown in FIG. 1.

Figure 10:
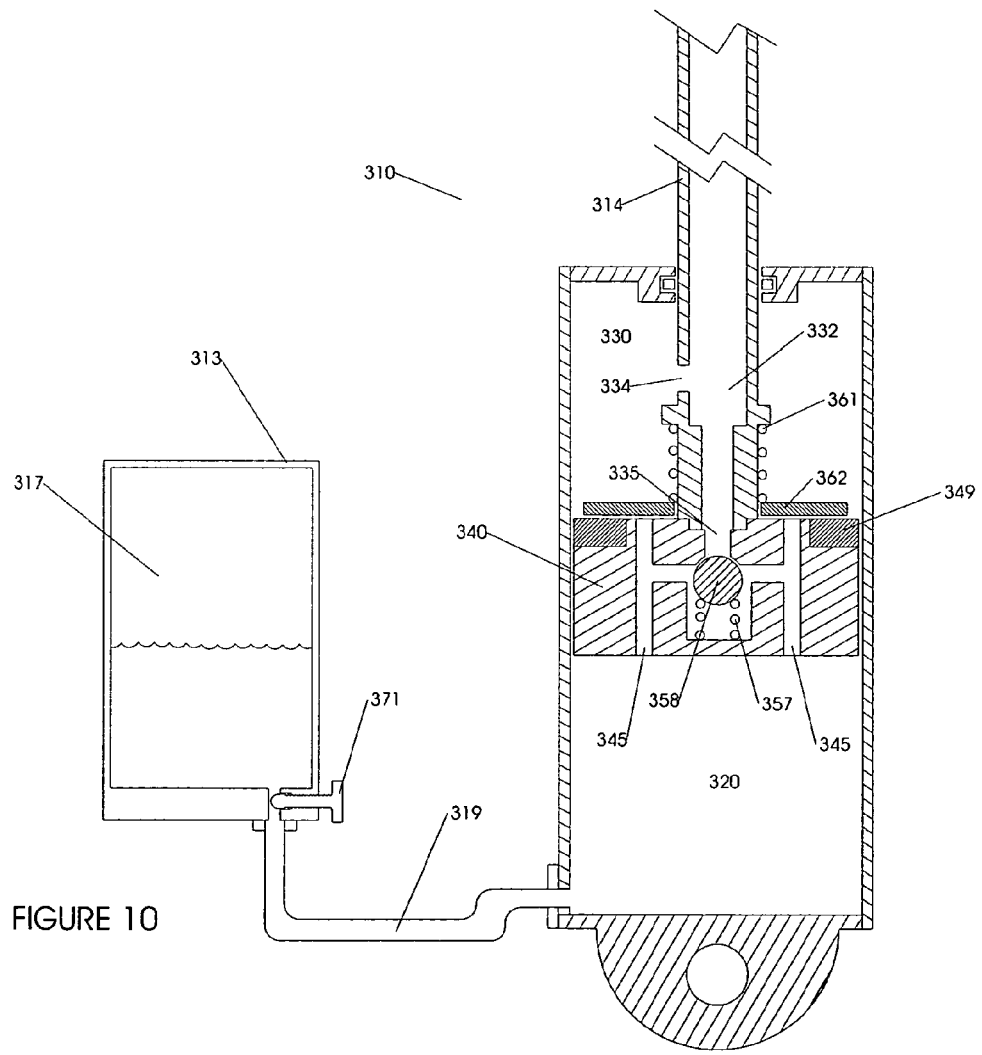
FIG. 10 is a side view in section illustrating the present invention in a shock absorber with a remote reservoir and a screw valve to adjust the hydraulic pressure on the magnetically biased valve element during compression of the shock absorber.

In the alternative embodiment of FIG. 10, many of the same elements of the device of FIG. 1 are present. However, one difference is that the chamber or reservoir 317, containing a gas or compressible medium, rather than being part of the cylindrical housing, is remotely contained in the canister 313 and connected with the housing by the hydraulic hose 319. Also, means for adjusting the response of the magnetically sprung valve consists of the screw valve 371 for regulating flow into the chamber 317, rather than varying the tension of the shim spring 361. The rate at which oil can flow through the ports 345, and therefore the pressure against the shim 362 for any given compressive load on the damper, will vary according to the rate at which oil displaced by the piston rod 314 can flow from the compression chamber 320 into the chamber 317. Thus, by varying the flow rate to and from the chamber 317 by adjusting the screw valve 371, one varies the pressure that can be exerted on the shim 362. One can thereby use the screw valve 371 to modify the performance of the shock absorber 310; in particular whether a given compression force on the shock absorber 310 will exert a sufficient fluid pressure on the shim 362 to exceed the magnetic bias between the shim 362 and the ring 349.

When the rate of flow past the screw valve 371 is relatively restricted, the rate of compression of the damper is slowed, which diminishes the threshold action of the valve due to the magnetic attraction between the ring 349 and the shim 362. This is because, as noted above, the rate of oil flow past the valve 371 affects the rate of oil flow through the ports 345. As the screw valve 371 is opened and the potential rate of flow into and out of the chamber 317 increases, the damping rate of the device under low accelerations and moderate loads decreases only slightly, while the damping rate for higher loads decreases dramatically. As a result of the dynamic interaction between the screw valve 371 and the shim 362, the screw valve 371 constitutes an adjusting means for the magnetically-generated threshold response of the damper. Thus, one can, in effect, adjust the threshold of the valve by adjusting a remote structure, such as the screw valve 371.

Figure 3:
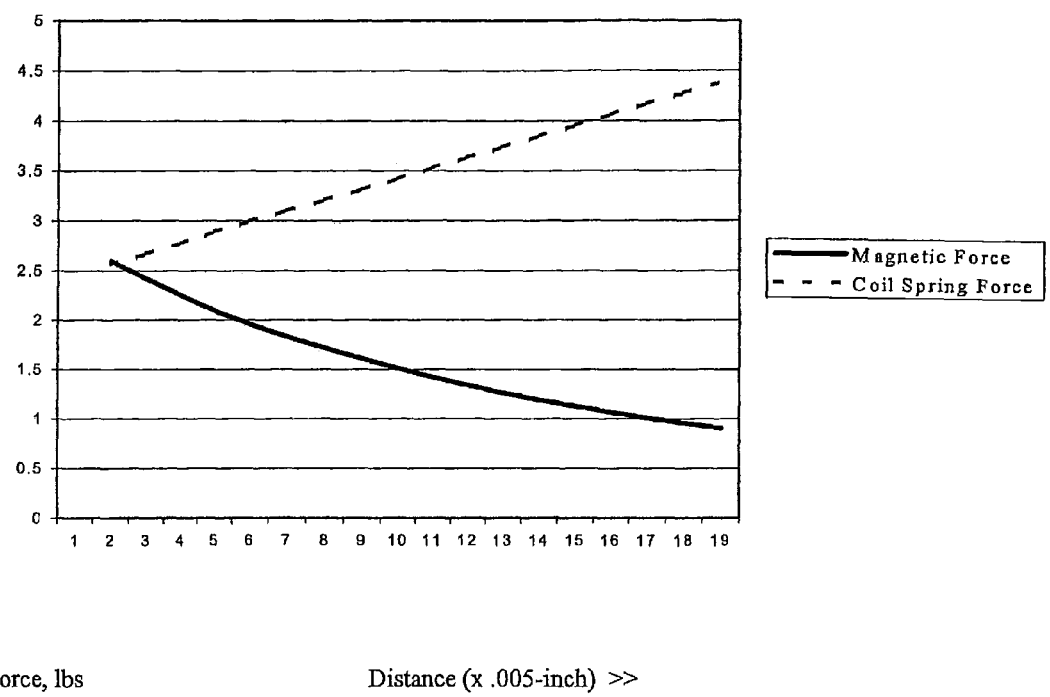
FIG. 3 is a graph of the force of a spring and of a magnet such as might be used to maintain closure of a shock absorber valve.

Referring to FIG. 3, the force of a mechanical (e.g., coil) spring such as might be used to maintain valve closure is plotted alongside that of a magnetic spring. The force acting upon the closed valve in both instances is just over 2.5 pounds. In the case of the coil spring, the opening of the valve will produce further spring compression, and therefore increased force, along a gradient that rises linearly according to the coil's spring rate. An essentially similar plot would obtain for another type of mechanical spring such a leaf spring, which for shock absorbers ordinarily takes the form of a flexible shim. By contrast, in the case of magnetic force tending to close the valve, as the valve opens the force between the magnetically attracted valve components will diminish as the distance between them increases, in keeping with the familiar inverse cube law governing magnetic field strength. The force tending to close the partially open valve will be reduced to the extent that the force is derived from magnetism as opposed to mechanical spring pressure.

Figure 4:
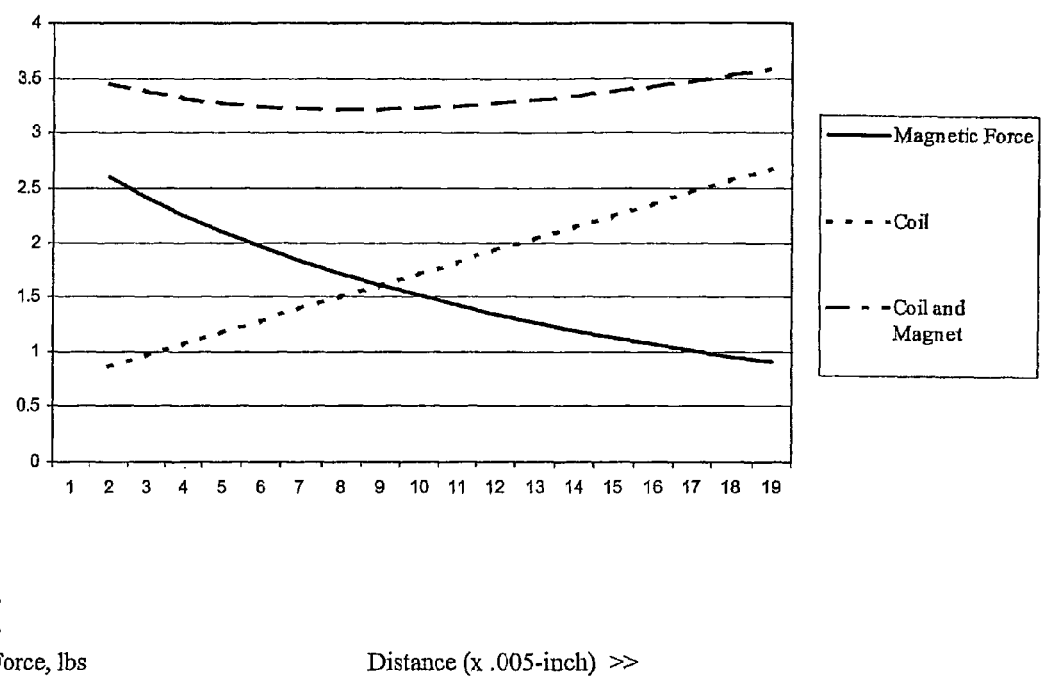
FIG. 4 is a graph of load versus deflection for a coil spring, for a magnetic valve and for a combination of spring and magnetism.

Referring to FIG. 4, plots of spring and magnetic force are shown along with a plot of their combined force as the valve opens. It is apparent that with magnetism contributing significantly to the total force maintaining valve closure, a relatively high initial force can be achieved without a substantial increase in such force as the valve opens. Of course, the extent to which the increase of closure force with valve movement is moderated or eliminated depends on the proportional contribution of magnetism to the total force in any given instance. Some external means of varying this contribution, either in absolute terms or relative to other biasing forces, is preferred to accommodate the suspension to particular loads, speeds and road or trail conditions. Therefore, it is contemplated that any combination of magnetic springs or magnetic and mechanical springs can be used, in combination with mechanical adjustment means to change the distance at which magnetic forces act and/or to vary the tension or spring rate of mechanical biasing means.

Still referring to FIG. 4, relatively high levels of initial valve closure force, such as the starting values for the plots of magnetic and combined coil spring-and-magnetic force, are useful in limiting unwanted chassis movements of a motorized vehicle or up-and-down bobbing of a bicycle rider who is shifting his body weight during pedaling. Such chassis movements involve low accelerations and therefore low peak forces against the damper valve. Only accelerated loads well beyond the initial closure force, like those that accompany the striking of a bump by the vehicle wheel, will open the valve sufficiently to allow free flow.

It will be understood that the invention described herein has application in any vehicle having a suspension that moves relative to the vehicle frame or body, including automobiles, motorcycles, all-terrain vehicles, trucks and bicycles, among others.

Figure 5:
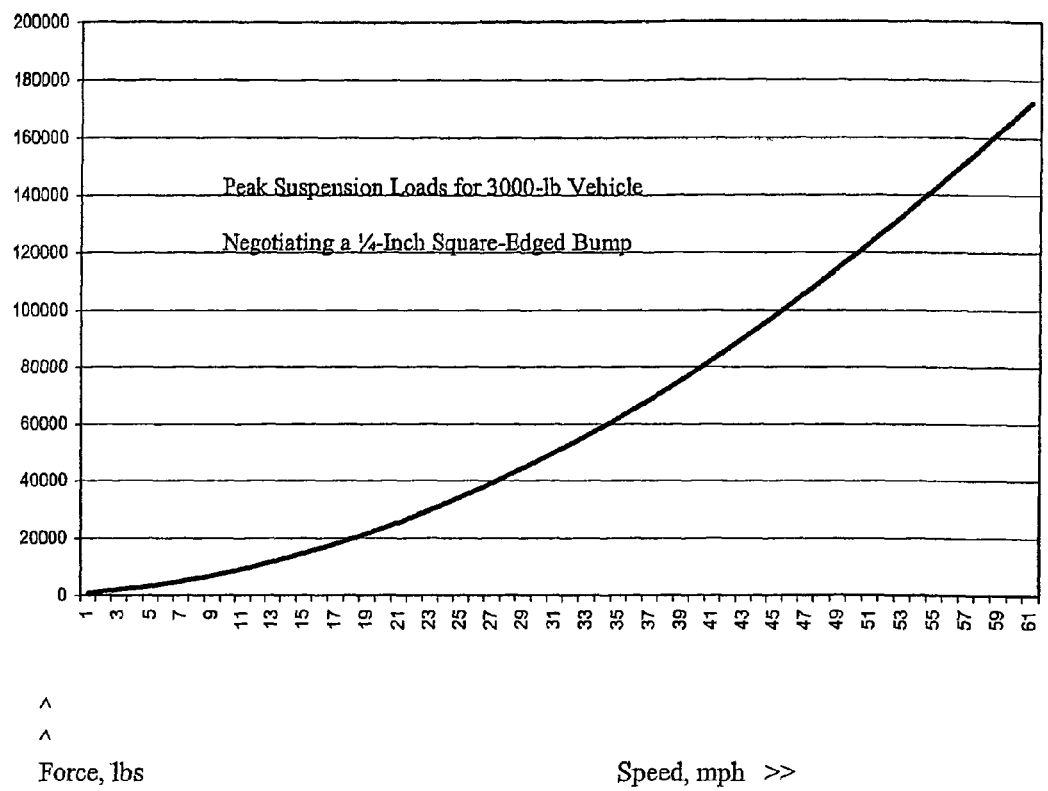
FIG. 5 is a graph of minimum peak suspension loads for a vehicle encountering a bump at various speeds.

Referring to FIG. 5, the graph shows minimum peak loads experienced by a typical automotive suspension (excluding hydraulic leverage effects) during negotiation of a bump ¼-inch in height. The calculation of the average speed, S, in inches per second of wheel/suspension movement during negotiation of a square-edged bump follows the simple formula: $S=(vh)/dCOS\Theta$, where v is the vehicle speed in inches per second (ips), h is the bump height in inches, d is the distance traversed (in inches) in surmounting the bump and $\Theta$ is the angle at which the suspension moves relative to perpendicular with the ground. The formula to determine the minimum acceleration, G, of the suspension during the event is therefore $G=(v/d*S)/384$, where 384 is the value of gravitational acceleration in inches per second squared. G may then be multiplied by the portion of vehicle weight carried over the wheel to determine the minimum peak load for the event.

Still referring to FIG. 5, it is apparent that because of high acceleration values even a small bump taken at modest speed generates peak loads equal to or greater than the portion of vehicle weight carried by a given wheel. By contrast, chassis movements, such as brake dive and body roll, in all but extreme cases involve acceleration of well under 1G and therefore generate loads of a minor fraction of such weight. It follows that suspension damper valves that inhibit chassis movement can remain responsive to bumps if they are sufficiently activated by peak loads. However, it is notoriously difficult to harness damper valve action to peak loads because of the geometry of vehicle suspension.

Figure 6:
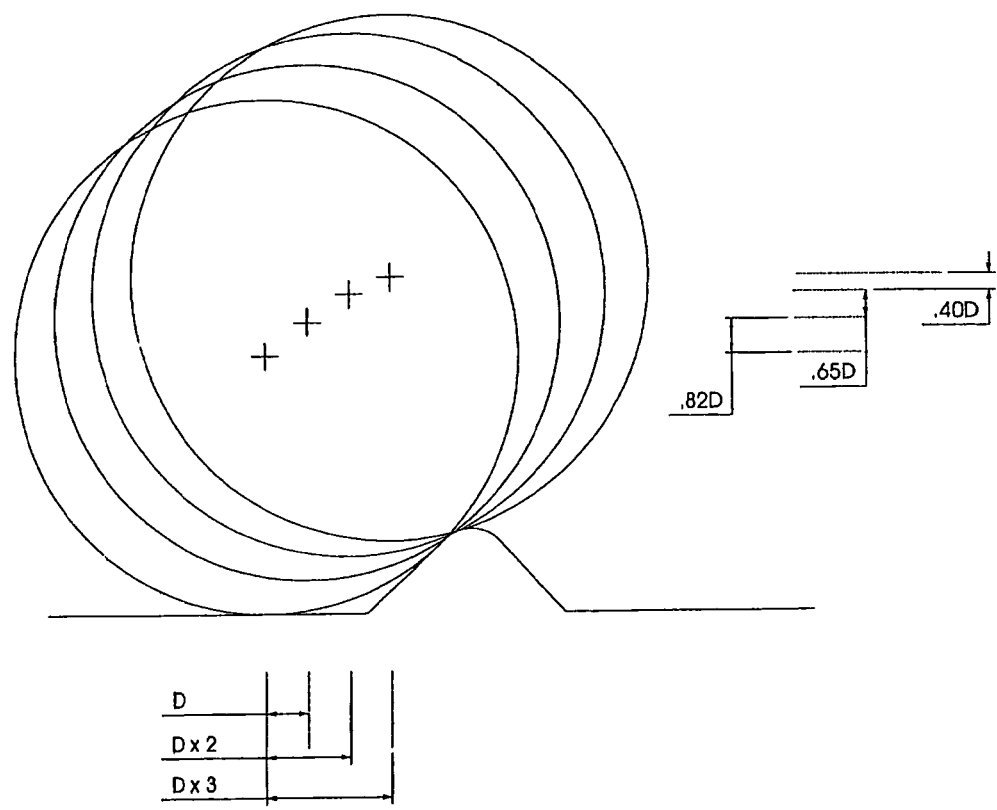
FIG. 6 is a schematic illustration showing the outline of a wheel progressively surmounting a bump with notations of horizontal and vertical displacement.

Referring now to FIG. 6, the vehicle wheel is shown in outline as it progressively moves over a bump. Because the wheel axis effectively rotates along an arcuate path around the apex of the bump, the vertical displacement of the wheel becomes progressively smaller for a given increment of forward movement. Assuming a constant vehicle speed, this means that the telescopic velocity of the suspension is greatest in the first half of the event. Peak force accompanying acceleration occurs at the beginning, nearly instantaneously. If pressure against the damper valve rises steeply as the valve opens, the pressure of the oil flow may be insufficient to hold the valve of the prior art open other than for a small fraction of the time required for traversal of the bump. This is particularly problematic where an initial threshold of valve actuation is desired in order to limit unwanted chassis movement. The more rapidly the valve closes upon dissipation of peak force, the more vertical movement will be transmitted to the vehicle rather than absorbed by the suspension. On the other hand, if closure force on the valve rises only moderately or even decreases as it opens, as with the present invention, hydraulic flow will continue relatively longer and the responsiveness of the suspension will be improved. Thus, with a configuration suitable to an automobile, the invention can be incorporated into an automobile shock absorber, and thereby provide superior ride and handling to conventional shock absorbers.

Figure 7A:
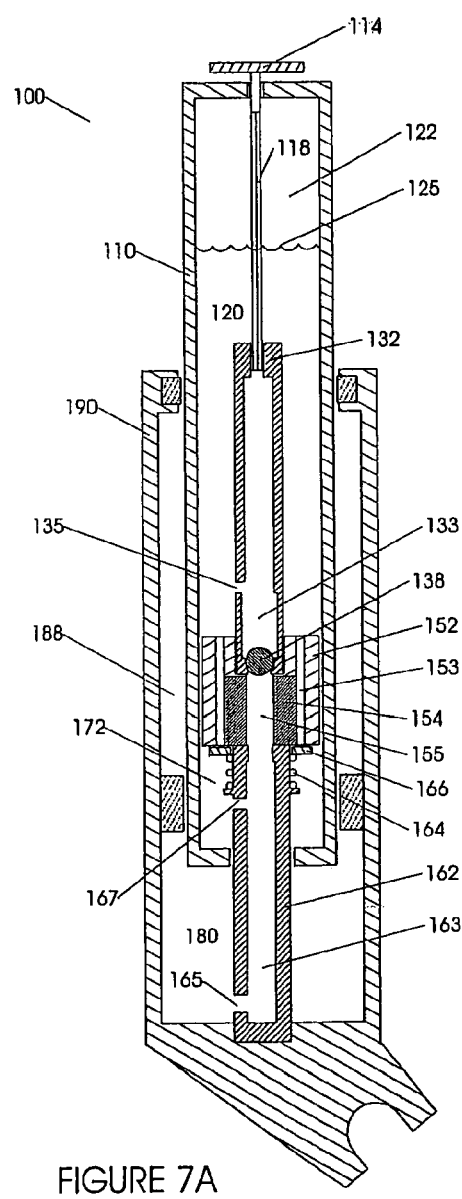
FIGS. 7A & 7B are side views in section illustrating an embodiment of the present invention in a bicycle fork leg.

Referring now to FIG. 7A, the bicycle fork leg 100 comprises the inner leg 110 in telescopic, sliding engagement with the outer leg 190. The compression chamber 180 of the outer leg 190 is filled with hydraulic fluid, the reservoir 125 for which is formed by the cavity 120 of the inner leg 110. (The suspension spring of the fork conventionally would be located in the opposite, parallel fork leg as will be understood by the person having ordinary skill in the bicycle suspension art, but is not shown here.) During compressive movement of the inner leg 110 relative to the outer leg 190, the displacement of fluid into the inner leg cavity 120 is made possible by the compression of a gas or other compressible medium in the space 122 above the fluid level.

The shock absorber damper of the leg assembly comprises the piston 152 and piston rod 162. Upon compression of the fork leg 100, fluid flows from the compression chamber 180 through the port 165, through the passage 163 and the restrictive port 167 in the piston rod 162 and into the rebound chamber 172 of the reservoir 120. However, the volume represented by the section of the inner leg 110 will displace fluid in the compression chamber 180 that cannot be accommodated by the expansion of the rebound chamber 172 and must flow upward through the piston 152 into the cavity 120 in order for compressive movement of the inner leg 110 relative to the outer leg 190 to occur. Because the return ports 153 of the piston 152 are sealed during compression by the rebound shim 166 under the action of the shim spring 164, fluid must flow into the cavity 120 through the passage 155 in the piston insert 154, past the valve ball 138, through the passage 133 in the adjustable valve seat 132 and out through the port 135.

Magnetic attraction between the valve ball 138 and the piston insert 154 directly opposes, and thereby restricts, flow of fluid during compression and consequently inhibits relative compressive movement of the fork leg 100 below a certain threshold of applied force. The magnitude of the closure force acting upon the valve components will be determined by the magnetic field strength of the valve ball 138 and/or piston insert 134 and the mass (or masses) upon which the magnetic field is acting as well as by the distance between the two valve components.

Upon re-extension of the fork leg 100 from a compressed state, fluid in the rebound chamber 172 will flow back to the compression chamber 180 by means of the restrictive port 167, the passage 163 and the port 165. Fluid that flowed past the valve ball 138 will be drawn back below the piston 152 through the return ports 153, since the pressure of the compressed gas or other compressible medium in the space 122 above the fluid level will overcome the upward (in FIG. 7A) pressure of the shim spring 164 against the shim 166.

Figure 7B:
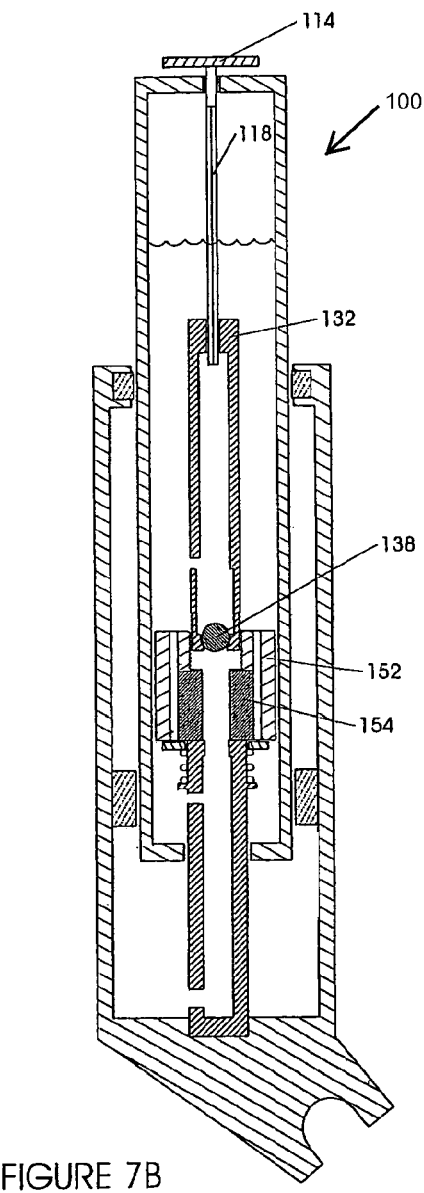

Referring now to FIG. 7B, the bicycle fork leg 100 is shown after an adjustment has been made to vary the closing force on the valve components. The rotatable control knob 114 is connected to the knob key 118, which in turn extends axially slidably through the adjustable valve seat 132. The knob key 118 has a polygonal periphery (such as square or hex) which mates with a corresponding polygonal aperture in the top of the valve seat 132 so that the valve seat 132 may be rotated by means of the knob 114. The valve seat 132 is threadably engaged with the piston 152 so that upon rotation of the valve seat 132 by means of the knob 114 the depth of insertion of the valve seat 132 into the piston 152, and therefore the distance between the valve ball 138 (which is the blocker) and the piston insert 154 (which is the orifice component), may be varied within a given range, as shown by the change in position of the valve components of FIGS. 7A and 7B. Because the level of magnetic closure force acting upon the valve ball 138 is strongly affected by the distance between the valve ball 138 and the piston insert 134, the force threshold for activation of the valve can be adjusted significantly by means of the knob 114. It is evident that any similar mechanical means for altering the distance at closure of the magnetically attracted components will have a similar effect.

Thus, the embodiment of FIG. 7A incorporates the invention, inasmuch as the shock absorber assembly of the fork leg 100 dampens the fluid flow using one or more valves that are held closed at least partially with an adjustable magnetic spring.

It will become apparent that the present invention may be configured so that the spring forces tending to close the valves are adjustable. The preferred embodiment, in which a magnetic and mechanical spring are used, can be adjusted to increase or decrease one spring separately from the other in order to affect the closing forces on the valve at various positions of the valve components relative to the other valve components. Alternatively, a magnetic spring can be used alone. Thus, by adjusting the spring's characteristics, one can achieve a damper valve closure that is maintained by a force that moderates as the valve opens. This retrogressive component of biasing force on the valve dramatically enhances suspension performance.

Figure 11:
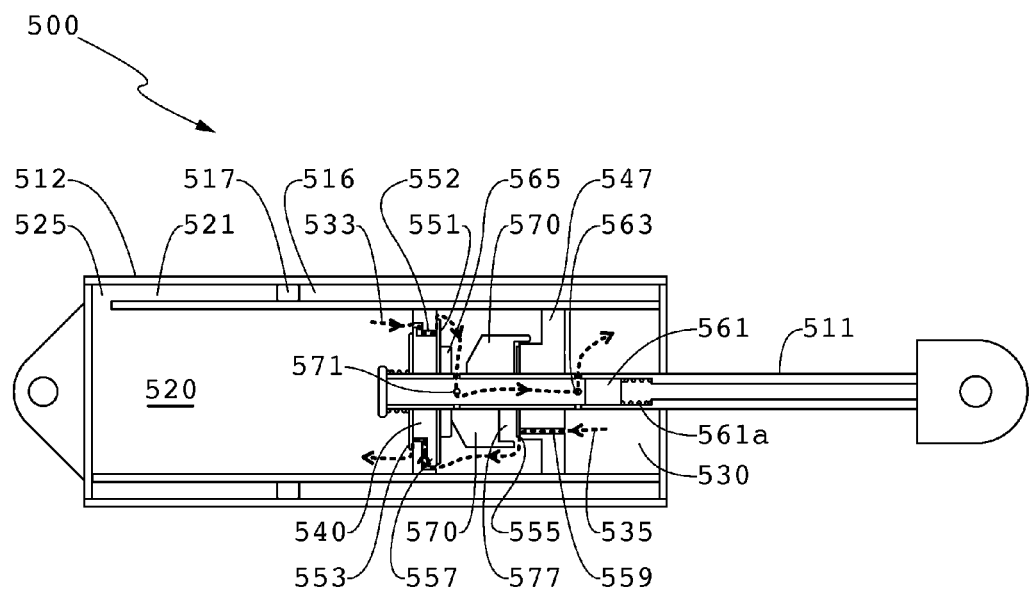
FIG. 11 is a schematic side view in section illustrating the present invention in a shock absorber with an inertia valve, with the top half of the illustration depicting an inertia valve in one position, and the bottom half of the illustration depicting the inertia valve in a second position.

Referring now to FIG. 11, which shows one state in the top half and another state in the bottom half, the shock absorber damper 500 includes the cylindrical housing 512, the piston rod 511 and the piston 540 fixed to the piston rod 511. The second wall 513 of the housing 512 defines the compartment 516 and the reservoir 521 therebetween. A gas in the compartment 516 is separated from the damping fluid in the reservoir 521 by the axially moveable, floating piston 517. Compression and expansion of the gas in the compartment 516 permits the level of fluid in the reservoir 521 (and thus the position of the floating piston 517) to vary with displacement of fluid from the chamber 520 through the port 525 as the piston rod 511 enters the housing.

The shim 551 deforms elastically to permit the compressive flow of fluid through the port 552 as indicated by the arrow given reference numeral 533, but prevents oppositely-directed fluid flow through the port 552. The valve body 561 mounted against the spring 561a inside the piston rod 511 permits compressive flow through the port 563 into the rebound chamber 530.

The shims 553 and 555 deform elastically to permit the rebound flow of fluid through the ports 557 and 559 as indicated by the arrow given reference numeral 535, but prevent oppositely-directed fluid flow through the ports 557 and 559.

Affixed to the piston rod 511 is the flange 547. The piston rod 511 extends axially slidably through the inertia valve mass 570 between the piston 540 and the flange 547. When the inertia valve mass 570 is in the closed position, as shown on the lower portion of FIG. 11, the mass 570 blocks the port 571 in the piston rod 511 and prevents or impedes compression of the shock absorber. If acceleration of the piston 540 relative to the cylindrical housing 512 dislodges the inertia valve mass 570 toward the flange 547, as shown on the upper portion of FIG. 11, fluid flows from the compression chamber 520 through the ports 552 and 571, past the valve body 561 and through port 563 into the rebound chamber 530. At the same time, fluid displaced by the volume of the piston rod 511 flows through the port 525 into the reservoir 521.

The ring 565 is affixed to the piston rod 511 adjacent to the shim 551. Either the inertia valve mass 570 or the ring 565 is a magnet, while the other is a magnetically permeable material. Both the inertia valve mass 570 and the ring 565 can be a magnet. Magnetic attraction between the inertia valve mass 570 and the ring 565 maintains the inertia valve mass 570 in the closed position until a bump force of sufficient magnitude on the piston rod 511 dislodges the valve mass 570. The force of magnetic attraction between the valve components (blockers), component mass 570 and orifice component ring 565 may be set so that once the inertia valve mass 570 is dislodged into the open position the magnetism will be insufficient by itself to return the inertia valve mass 570 to the closed position.

Once the inertia valve is open, the mass 570 will remain there until the compression stroke is finished and the shock begins to rebound. After compression, the spring 561a moves the valve body 561 toward the piston 540, closing the port 563. During rebound, fluid is forced through the port 559 and past the shim 555 into the pocket 577 between the inertia valve mass 570 and the flange 547. The flow of fluid through the port 559 and into the pocket 577 under pressure moves the inertia valve mass 570 toward the piston 540 until magnetic attraction between the inertia valve mass 570 and the ring 565 causes the valve mass 570 to be captured in the closed position once again by the magnetic attraction.

It can be seen that the inertia valve mass 570, being maintained in the closed position by magnetism, can be configured to remain open during the entire compression stroke rather than returning to the closed position prematurely as it would tend to do if a coil spring were used to maintain closure. The use of magnetism further permits return of the inertia valve mass to be accomplished by the force of rebound so that the function of the shock is consistent and predictable regardless of the speed, magnitude or frequency of compressions.

Figure 12:
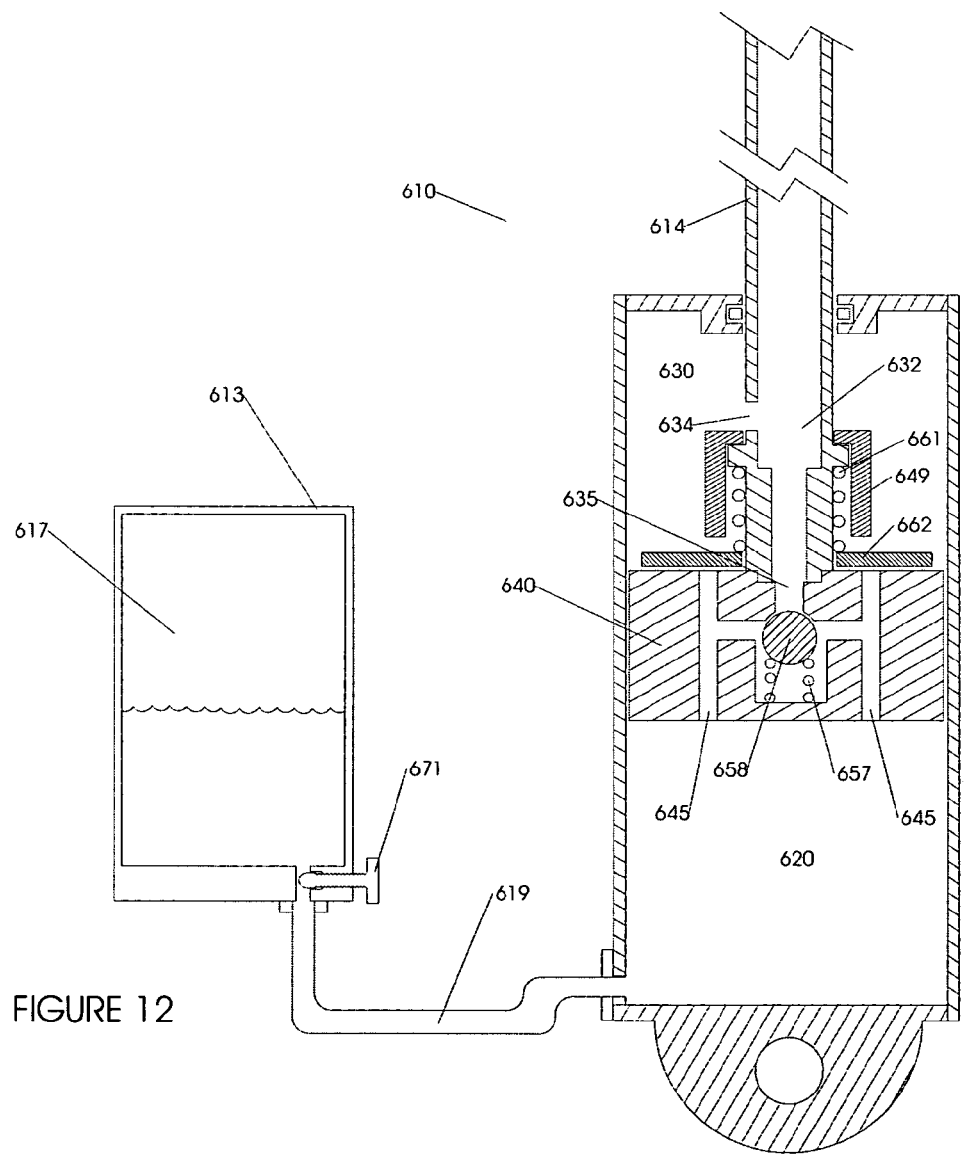
FIG. 12 is a schematic side view in section illustrating an alternative embodiment of the present invention.

In the alternative shock absorber damper 610 of FIG. 12, many of the same structural elements of the shock absorber dampers of FIGS. 1 and 10 are present, including a cylindrical housing 612, a piston rod 614, a rebound chamber 630 and a piston 640. A compression shim 662 that has a magnetically permeable material, preferably steel, is part of the valve and is biased into the closed position, shown in FIG. 12, by a coil spring 661. Unique to the FIG. 12 embodiment is the opener component, preferably the magnetically permeable ring 649, which is preferably a permanent magnet rigidly mounted to the piston rod 614 at a point spaced from the orifices of the ports 645. The magnetic attraction between the shim 662 and the ring 649 urges the shim 662 toward the open position as described in detail below.

The spring 661 urges the shim 662 in sealing contact against the piston 640, thereby blocking or severely restricting oil flow through the ports 645 below a threshold of hydraulic pressure in the compression chamber 620. The shim 662 thus serves as an orifice blocker of the valve. The bias force closing the valve is not magnetic attraction, as in the embodiment of FIG. 1, but preload of the coil spring 661. Of course, magnetic attraction could serve as part of the bias tending to close the valve, but this is not preferred in the embodiment of FIG. 12. Under low compressive loads on the shock absorber, such as those accompanying inertial forces on the vehicle chassis, the shim 662 significantly restricts oil flow through the ports 645. Under the higher loads that accompany bumps at speed, the shim 662 begins to open as it compresses the spring 661. This permits fluid flow through the ports 645 and rapid compression of the shock absorber.

As the spring 661 is compressed during displacement of the shim 662 away from the closed position shown in FIG. 12, an increasing force is required to compress the conventional coil spring 661 an increasing distance. Stated differently, the farther the spring 661 compresses, the greater the force that the spring 661 exerts on the shim 662 tending to close the shim 662. In conventional shock absorbers, this phenomenon would cause the valve to close rapidly before completion of the event that opened the valve. With the invention, however, this is not so due to the sleeve 649 and its cooperation with the shim 662.

Magnetic attraction between the shim 662 and the magnetic sleeve 649 urges the shim 662 toward the open position and opposes the bias force of the coil spring 661. As the shim 662 is displaced away from the piston 640 and closer to the sleeve 649, the magnetic attraction increases, thereby effectively mitigating or canceling, depending upon the amount of magnetic attraction and the characteristics of the attraction, the increase in valve-closing force due to the spring 661. This allows the fluid to flow through the ports 645 for a relatively longer time during compression, which diminishes the transference of motion to the vehicle as the bump is traversed.

The velocity at which the piston rod 614 can re-extend after compression is governed by the rate at which oil can flow from the rebound chamber 630 into the hollow cavity 632 of the piston rod 614, through the orifice 635 of the piston 640, past the valve ball 658 (as the closing pressure of the valve spring 657 is overcome), and through the ports 645 into the compression chamber 620. As in the device of FIG. 10, the alternative embodiment of FIG. 12 has an oil reservoir, which can be the separate container shown in FIG. 12, or alternatively can be formed within the housing, as in the embodiment of FIG. 1. Oil flows from the compression chamber 620 through the hydraulic hose 619 to the reservoir 613 to accommodate displacement of fluid by the piston rod 614. By regulating the rate of this fluid flow, the screw valve 671 also regulates the response of the shim 662 to compressive loads, and therefore the threshold action of the shock absorber damper 610.

While certain preferred embodiments of the present invention have been disclosed in detail, it is to be understood that various modifications may be adopted without departing from the spirit of the invention or scope of the following claims.

The invention claimed is:

1. A shock absorber having a housing with a cylindrical sidewall, a piston slidably mounted for reciprocating through a piston stroke in, and sealingly engaging, the sidewall, a first chamber formed on one side of the piston within the housing and containing fluid and a second chamber in the housing containing fluid, the shock absorber comprising:
   (a) a valve in a fluid communication path between the first and second chambers, the valve having an orifice component and a moveable orifice blocker component, wherein the blocker has at least an open position in which fluid can flow through the orifice and a closed position in which the blocker substantially obstructs fluid from flowing through the orifice and wherein the orifice blocker is configured to move from the closed position to the open position solely through an inertial effect of forces that are applied to the orifice blocker and tend to cause at least a partial stroke of the shock absorber;
   (b) at least one biasing element disposed in the valve that exerts a first biasing force urging the blocker toward said closed position and contributes to a total biasing force that urges said blocker in the closed position to remain in said closed position; and
   (c) wherein every component of said total biasing force is applied to the blocker by structures contained entirely within the shock absorber and every component of said total biasing force that is controlled so as to vary said total biasing force is controlled only by at least one non-electromagnetic device selected from the group of pneumatic, hydraulic and mechanical devices; and wherein when the blocker is in the open position the first biasing force is no greater for any particular piston stroke position than said total biasing force; and wherein the first biasing force at at least one piston stroke position is insufficient by itself to return the blocker to the closed position.

2. The shock absorber according to claim 1, further comprising a third chamber in fluid communication with at least one of the other two chambers.

3. The shock absorber according to claim 2, wherein the first chamber is a compression chamber, the second chamber is a rebound chamber and the third chamber is a reservoir chamber.

4. The shock absorber according to claim 2, further comprising a port disposed in a fluid communication passage between the third chamber and at least one of the other two chambers.

5. A shock absorber with a housing having a cylindrical sidewall, a piston slidably mounted in, and sealingly engaging, the sidewall, a first chamber formed on one side of the piston within the housing and containing fluid and a second chamber in the housing containing fluid, the shock absorber comprising:
   (a) a valve in a fluid communication path between the first and second chambers, the valve having an orifice component and an orifice blocker component that is moveable by an inertial effect of forces that are applied to the orifice blocker and tend to displace the piston and the sidewall relative to one another, wherein the blocker has at least an open position in which fluid can flow through the orifice and a closed position in which the blocker substantially obstructs fluid from flowing through the orifice; and
   (b) a permanent magnet in at least one of said valve components and a magnetically permeable body in the other of said valve components, whereby the blocker is urged toward one of the blocker positions by a magnetic bias formed by the permanent magnet and the magnetically permeable body, wherein upon sufficient inertial force upon the blocker the magnetic bias is exceeded, thereby forcing the blocker from the one of the blocker positions to the other of the blocker positions; wherein the blocker is permitted to move to a position where the magnetic bias is insufficient by itself to return the blocker from the other of the blocker positions to the one of the blocker positions.

6. The shock absorber in accordance with claim 5, wherein the first chamber is a compression chamber and the second chamber is a rebound chamber.

7. The shock absorber in accordance with claim 5, wherein the magnetic bias tends to bias the blocker toward the closed position.

8. The shock absorber in accordance with claim 5, further comprising a a third chamber intermediate the first chamber and the second chamber.

9. The shock absorber in accordance with claim 5, further comprising at least a second orifice allowing fluid passage through the piston.

10. A shock absorber with a housing having a cylindrical sidewall, a piston slidably mounted in, and sealingly engaging, the sidewall, a first chamber formed on one side of the piston within the housing and containing fluid, a second chamber in the housing containing fluid, a third chamber accommodating a variable volume of fluid, said third chamber in fluid communication with the first chamber, the shock absorber comprising:
   (a) a valve in a fluid communication path between the first chamber and a selected one of the other chambers, the valve having an orifice component and an orifice blocker component, at least one of which is moveable by an inertial effect of forces applied to the shock absorber that tend to displace at least one of the valve components relative to the other of said valve components, wherein at least one of said valve components is moveable relative to another of said valve components between at least (i) an open valve position in which fluid can flow through the orifice between the first chamber and the selected chamber and (ii) a closed valve position in which the blocker substantially obstructs fluid from flowing through the orifice; and
   (b) a permanent magnet in at least one of said valve components and a magnetically permeable body in the other of said valve components, whereby the valve components are urged toward one of the valve positions by a magnetic bias formed by the permanent magnet and the magnetically permeable body, wherein upon sufficient inertial effect of forces applied to at least one of the valve components the magnetic bias is exceeded, thereby causing the valve components to move from one of the valve positions to the other valve position; and wherein the magnetic bias is insufficient by itself to return the valve to the one of the valve positions from the other valve position.

11. The shock absorber in accordance with claim 10, wherein the first chamber is a compression chamber, the second chamber is a rebound chamber, and the third chamber is a reservoir chamber.

12. The shock absorber in accordance with claim 10, wherein the magnetic bias tends to bias the blocker toward the closed position.

13. The shock absorber in accordance with claim 10, further comprising a a fourth chamber intermediate the first chamber and the second chamber.

14. The shock absorber in accordance with claim 10, further comprising at least a second orifice allowing fluid passage through the piston.

15. A shock absorber having a housing with a cylindrical sidewall, a piston slidably mounted for reciprocating through a piston stroke in, and sealingly engaging, the sidewall, a first chamber formed on one side of the piston within the housing and containing fluid, a second chamber in the housing containing fluid, a third chamber accommodating a variable volume of fluid, said third chamber in fluid communication with the first chamber, the shock absorber comprising:
   (a) a valve in a fluid communication path between the first chamber and a selected one of the other chambers, the valve having an orifice component, an opener component spaced from the orifice and an orifice blocker component that is moveable by an inertial effect of forces applied to the blocker component that tends to displace the blocker component relative to the orifice component, wherein the blocker has at least an open position in which fluid can flow through the orifice and a closed position in which the blocker substantially obstructs fluid from flowing through the orifice; and
   (b) a non-electromagnetic permanent magnet in one of said blocker and said opener, and a non-electromagnetic magnetically permeable body in the other of said blocker and said opener for urging the blocker toward the open position, wherein upon sufficient inertial effect of force upon the blocker the blocker is moved from one of the blocker positions to the other of the blocker positions; and
   wherein the blocker is initially moved from the other of the blocker positions towards the one of the blocker positions through a force other than magnetic force.

16. The shock absorber in accordance with claim 15, wherein the first chamber is a compression chamber, the second chamber is a rebound chamber, and the third chamber is a reservoir chamber.

17. The shock absorber in accordance with claim 15, wherein magnetic bias tends to bias the blocker toward the closed position.

18. The shock absorber in accordance with claim 15, further comprising a fourth chamber intermediate the first chamber and the second chamber.

19. The shock absorber in accordance with claim 15, further comprising at least a second orifice allowing fluid passage through the piston.

20. The shock absorber according to claim 15, further comprising a mechanical spring seating against a second blocker and urging the second blocker toward the closed position.

21. A shock absorber with a housing having a cylindrical sidewall, a piston slidably mounted in, and sealingly engaging, the sidewall, a first chamber containing fluid, and a second chamber containing fluid, the shock absorber comprising:
   (a) a valve in a fluid communication path between the first chamber and the second chamber, the valve having an orifice component and an orifice blocker component, wherein the orifice component and the orifice blocker component are configured to move relative to one another between at least an open valve position in which the orifice blocker component is spaced from the orifice component and a closed valve position in which the orifice blocker component is adjacent, and substantially obstructs fluid from flowing through, the orifice;
   (b) a magnetically attractive element positioned adjacent the orifice blocker component, whereby the orifice blocking component is urged toward one of the valve positions by a magnetic bias formed by the magnetically attractive element and the orifice blocker component; and
   (c) wherein upon sufficient inertial effect of force upon at least one of the orifice blocking component and the magnetically attractive element, the magnetic bias between the magnetically attractive element and the orifice blocker component is exceeded, thereby causing the orifice blocker component to move from one of the valve positions to the other of the valve positions; and wherein the magnetic bias is insufficient by itself to return the orifice blocker component to the one of the valve positions from the other of the valve positions.

22. The shock absorber according to claim 21, further comprising a biased secondary valve configured to open and close a third orifice.

23. The shock absorber according to claim 21, wherein the first chamber is a compression chamber and the second chamber is a rebound chamber.

24. The shock absorber according to claim 23, further comprising a reservoir chamber in fluid communication with at least one of the first chamber and the second chamber.

25. The shock absorber according to claim 21, wherein the valve defines a serpentine path for fluid to travel.

26. The shock absorber according to claim 21, wherein the magnetically attractive element comprises a permanent magnet.

27. The shock absorber according to claim 21, wherein the orifice blocking component comprises a permanent magnet.

\* \* \* \* \*

UNITED STATES PATENT AND TRADEMARK OFFICE
CERTIFICATE OF CORRECTION

PATENT NO. : 8,727,080 B2  
APPLICATION NO. : 13/345197  
DATED : May 20, 2014  
INVENTOR(S) : Barefoot Page 1 of 1

It is certified that error appears in the above-identified patent and that said Letters Patent is hereby corrected as shown below:

In the Claims

Column 15 Claim 8, line 8, delete "a"

Column 15 Claim 13, line 57, delete "a"

Signed and Sealed this
Twenty-ninth Day of July, 2014

Michelle K. Lee
*Deputy Director of the United States Patent and Trademark Office*